R. HUFF.
ADJUSTABLE BEARING BOX FOR MOTOR VEHICLES.
APPLICATION FILED AUG. 5, 1912.
1,103,289.
Patented July 14, 1914.
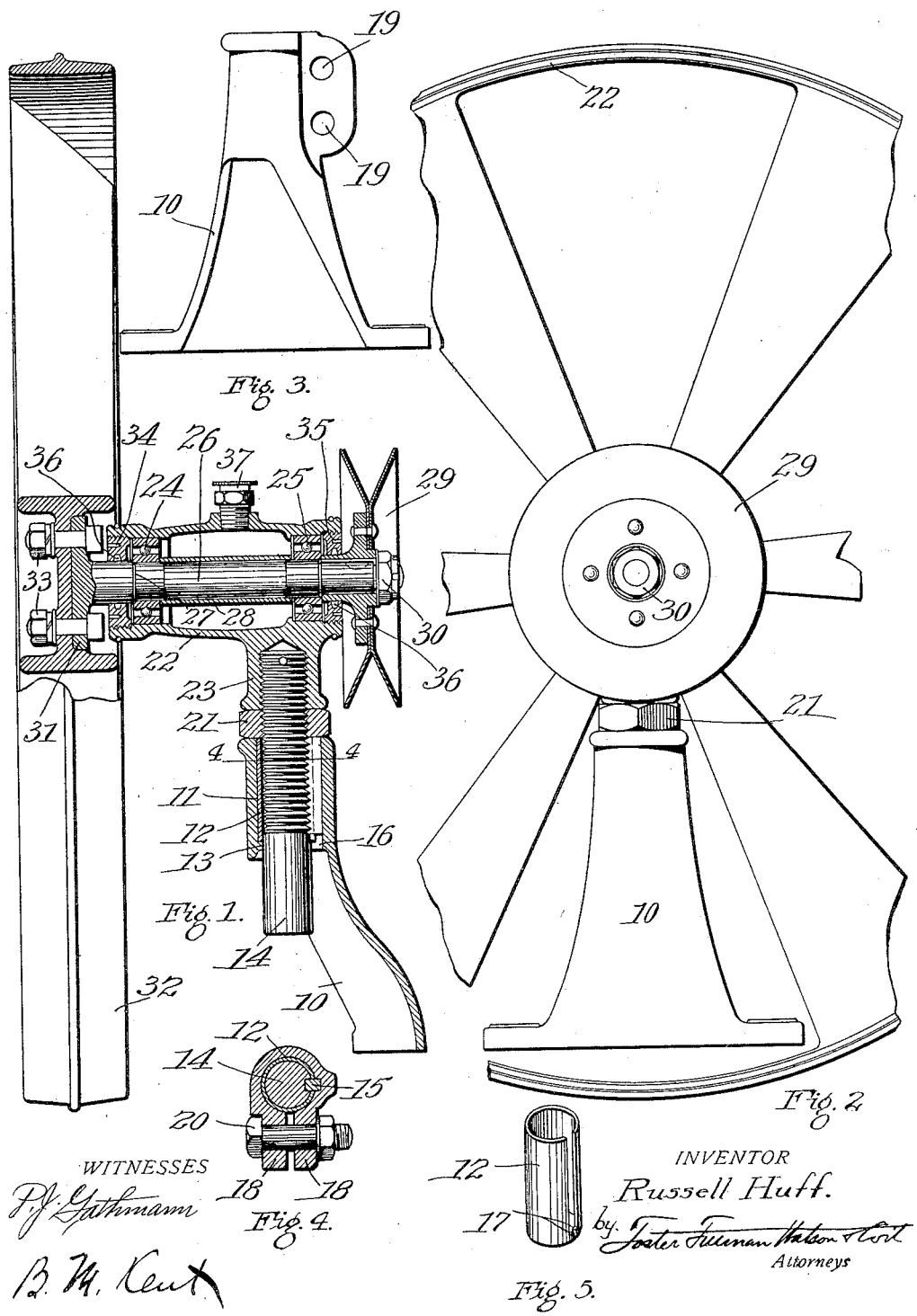
INVENTOR
Russell Huff.

UNITED STATES PATENT OFFICE.

RUSSELL HUFF, OF DETROIT, MICHIGAN, ASSIGNOR TO PACKARD MOTOR CAR COMPANY, OF DETROIT, MICHIGAN, A CORPORATION OF MICHIGAN.

ADJUSTABLE BEARING-BOX FOR MOTOR-VEHICLES.

1,103,289. Specification of Letters Patent. Patented July 14, 1914.

Application filed August 5, 1912. Serial No. 713,328.

*To all whom it may concern:*

Be it known that I, RUSSELL HUFF, a citizen of the United States, residing at Detroit, Wayne county, State of Michigan, have invented certain new and useful Improvements in Adjustable Bearing-Boxes for Motor-Vehicles, of which the following is a specification.

This invention relates to motor vehicles and more particularly to improved means for mounting the usual fan which is employed to draw air through the radiator.

The objects of the invention are to provide an adjustable bracket in which the fan shaft is mounted with the driving pulley and the fan arranged at the opposite ends of the fan shaft and the bearings for the shaft arranged between the fan and the driving pulley.

The features of novelty of the invention will be apparent from the following description taken in connection with the accompanying drawings in which:

Figure 1 is a vertical section of a fan supporting bracket embodying the invention. Fig. 2 is a rear view of the fan and bracket shown in Fig. 1. Fig. 3 is a front view of a part of the supporting bracket. Fig. 4 is a section on the line 4—4 of Fig. 1. Fig. 5 is a perspective view of a detail.

In the drawings 10 indicates the fixed base or supporting part of the bracket which is provided with a vertical opening 11 in its upper part, this opening having arranged therein the split sleeve 12, the lower end of which is supported on the inwardly projecting ledge or flange 13. Arranged within the sleeve 12 is a threaded spindle 14 which is provided with a keyway for the key 15, this key extending through the sleeve 12 and being arranged in a keyway 16 formed in the base or support 10. The sleeve 12 is provided at the lower end of the opening through which the key 15 projects with lugs 17 which support the key. The upper part of the base or support 10 is split as shown in Fig. 4 and provided with the flanges or lugs 18 having openings 19 for bolts 20 by means of which the sleeve 12 and the spindle 14 may be clamped in position. Arranged on the spindle 14 above the support 10 is a nut 21 by means of which the spindle may be raised or lowered in the support when the bolts 20 are loosened.

A bearing member 22 is arranged above the support 10 and provided with a downwardly extending lug 23 which has threaded engagement with and is secured on the upper end of the spindle 14 as is clearly shown in Fig. 1. The bearing member 22 carries the roller bearings 24 and 25 which support the fan shaft 26. The inner member of the bearing 24 engages a shoulder 27 on the shaft 26 and a sleeve 28 surrounds the shaft and is arranged between the bearings 24 and 25 and acts as a spacer for the same. A driving pulley 29 is keyed to the end of the shaft 26 and bears against the inner member of the bearing 25, and a nut 30 is provided for the purpose of securing the pulley 29 on the shaft and holds the bearings 24 and 25 against longitudinal movement on the shaft. The opposite end of the shaft 26 is provided with a flange 31 to which the fan 32 is secured by means of bolts 33. Any suitable packing means may be provided at the ends of the bearing member 22 for the purpose of preventing dust from entering the bearings and for this purpose I have shown the packing rings 34 and 35, these rings being provided with the usual internal grooves 36 which may be supplied with grease or felt or other packing material. It will be observed that the ring 35 surrounds the hub of the pulley 29.

From Fig. 1 it will be seen that the bearing member 22 is provided with a central annular chamber and in order to thoroughly lubricate the bearings 24 and 25 I supply this chamber with lubricant through a suitable cup 37.

Having thus described the invention what is claimed as new is:

1. In a motor vehicle, the combination of a bracket, a bearing member carried by said bracket, means for adjusting said bearing member on said bracket and comprising a spindle secured to said bearing member and arranged in an opening in said bracket, means for moving said spindle in the direction of its axis, a split sleeve surrounding said spindle and supported directly by said bracket, and a key supported by said sleeve and adapted to prevent said spindle from turning in said bracket.

2. In a motor vehicle, the combination of a support having a hollow cylindrical portion, a bearing member supported by said bracket, and means for adjusting said bearing member relative to the bracket and comprising a threaded spindle secured to the bearing member and extending through the opening in the cylindrical portion of said bracket, a nut on said spindle and engaging one end of the cylindrical portion of the bracket, a split sleeve arranged on the interior of the cylindrical portion of the bracket and supported directly by the bracket, and a key engaging said spindle and said bracket and adapted to hold the spindle against rotation, said sleeve having means adapted to engage one end of the key and support the latter.

In testimony whereof I affix my signature in presence of two witnesses.

RUSSELL HUFF.

Witnesses:
  LE ROI F. WILLIAMS,
  CHAS. J. FITZSIMONS.